(12) United States Patent
Jiao

(10) Patent No.: US 11,810,234 B2
(45) Date of Patent: Nov. 7, 2023

(54) METHOD AND APPARATUS FOR PROCESSING AVATAR USAGE DATA, DEVICE, AND STORAGE MEDIUM

(71) Applicant: TENCENT TECHNOLOGY (SHENZHEN) COMPANY LIMITED, Guangdong (CN)

(72) Inventor: Yongrong Jiao, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 16 days.

(21) Appl. No.: 17/513,339

(22) Filed: Oct. 28, 2021

(65) Prior Publication Data

US 2022/0122310 A1  Apr. 21, 2022

Related U.S. Application Data

(63) Continuation of application No. PCT/CN2021/080826, filed on Mar. 15, 2021.

(30) Foreign Application Priority Data

Apr. 24, 2020 (CN) .......................... 202010335073.1

(51) Int. Cl.
*G06T 13/40* (2011.01)
(52) U.S. Cl.
CPC .................... *G06T 13/40* (2013.01)
(58) Field of Classification Search
None
See application file for complete search history.

(56) References Cited

U.S. PATENT DOCUMENTS 10,699,462 B1 * 6/2020 Baszucki ............... A63F 13/79
10,748,350 B1 * 8/2020 Lin ......................... G06T 13/40
(Continued)

FOREIGN PATENT DOCUMENTS

CN 1710585 A 12/2005
CN 108096832 A 6/2018
(Continued)

OTHER PUBLICATIONS

Gao et al., "Gendered Design Bias: Gender Differences of In-Game Character Choice and Playing Style in League of Legends" (Year: 2017).*

(Continued)

*Primary Examiner* — Hilina K Demeter
(74) *Attorney, Agent, or Firm* — ARENTFOX SCHIFF LLP

(57) ABSTRACT

In embodiments of a method and apparatus for processing avatar usage data, a user obtains the avatar usage data, so as to use a plurality of avatars. If the user selects a target avatar from the plurality of avatars, the target avatar is loaded in the target round, and the permission data of the target avatar associated with the avatar usage data is updated. Through embodiments of the method and apparatus, the user does not need spend a lot of time in collecting different avatars when the user wants to use the different avatars, thereby reducing complexity of user operations, simplifying operation steps, and improving the efficiency of human-computer interaction.

20 Claims, 9 Drawing Sheets

(56) References Cited

U.S. PATENT DOCUMENTS

| | | | |
|---|---|---|---|
| 10,821,364 B2 | 11/2020 | Laker et al. | |
| 2006/0035606 A1* | 2/2006 | Cho | H04M 11/062 |
| | | | 455/116 |
| 2007/0155508 A1 | 7/2007 | Sun et al. | |
| 2009/0029769 A1* | 1/2009 | Muller | A63F 13/58 |
| | | | 463/31 |
| 2010/0229108 A1 | 9/2010 | Gerson et al. | |
| 2010/0317423 A1 | 12/2010 | Osborne | |
| 2019/0272661 A1 | 9/2019 | Reeves et al. | |
| 2020/0078689 A1* | 3/2020 | Eatedali | A63F 13/79 |
| 2020/0298129 A1* | 9/2020 | Bress | A63F 13/822 |

FOREIGN PATENT DOCUMENTS

| | | |
|---|---|---|
| CN | 108459811 A | 8/2018 |
| CN | 108579089 A | 9/2018 |
| CN | 110917630 A | 3/2020 |
| CN | 111596838 A | 8/2020 |
| GB | 1432761 A | 4/1976 |

OTHER PUBLICATIONS

International Search Report dated Apr. 24, 2020 in International Application No. PCT/CN2021/080826, 11 pgs.

Chinese Office Action dated Jan. 27, 2021 in Chinese Application No. 202010335073.1 with English translation, 7 pgs.

Leagues of Legends Operation Team, League of Legends Skin Card Use Announcement, <UR:Lhttp://lol.qq.com/webplat/info/news_version3/152/4585/4586/m3238/201303/194378.shtml>, 2 pgs.

Pen name I don't know what I wrote, "How to get S-rank ninja experience card in Naruto mobile game", Nov. 25, 2019, <https://jingvan.baidu.com/article/2fb0ba40792489440f2ec5ffa.html>, 4 pgs.

* cited by examiner

METHOD AND APPARATUS FOR PROCESSING AVATAR USAGE DATA, DEVICE, AND STORAGE MEDIUM

RELATED APPLICATIONS

This application is a continuation of International Application No. PCT/CN2021/080826, filed on Mar. 15, 2021, which claims priority to Chinese Patent Application No. 202010335073.1, entitled "SERVICE PROCESSING METHOD AND APPARATUS, COMPUTER DEVICE, AND COMPUTER-READABLE STORAGE MEDIUM" and filed on Apr. 24, 2020. The disclosures of the prior applications are hereby incorporated by reference in their entirety.

FIELD OF THE TECHNOLOGY

This application relates to the field of computer technologies, including a method and an apparatus for processing avatar usage data, a device, and a storage medium.

BACKGROUND OF THE DISCLOSURE

With the development of computer technologies and diversification of terminal functions, an increasing quantity of network games emerge, where role-playing games gradually become a very important category of online games. In a role-playing game, experience card props are provided. One experience card provides an experience function for a specific avatar, that is, hero or skin. In addition, the experience card usually has an experience time limit. For example, an experience time of an experience card may be set to 3 days. Tithe experience card expires after 3 days, then a user cannot try an avatar corresponding to the experience card in the game alter the 3 days have expired.

SUMMARY

Embodiments of this application provide a method and an apparatus for processing avatar usage data, a device, and a storage medium. The technical solutions are as follows.

In an embodiment, a method for processing avatar usage data includes querying obtained avatar usage data in response to starting of a round, the avatar usage data indicating a use permission for at least two avatars, and determining, among a plurality of avatars, at least two first avatars associated with the avatar usage data and determining permission data of the first avatars. The method further includes displaying, by processing circuitry of a computer device, avatar selection controls of the at least two first avatars in a selectable state on an avatar selection interface, a first avatar selection control of the avatar selection controls displaying permission data of a corresponding first avatar. The method also includes loading a first avatar of the at least two first avatars during the round in response to a selection operation on the first avatar selection control on the avatar selection interface, and updating, in response to an end of the round, permission data of the first avatar associated with the avatar usage data.

In an embodiment, an apparatus for processing avatar usage data includes procession circuitry configured to query obtained avatar usage data in response to starting of a round, the avatar usage data indicating a use permission for at least two avatars, and determine, among a plurality of avatars, at least two first avatars associated with the avatar usage data and determining permission data of the first avatars. The processing circuitry is further configured to display avatar selection controls of the at least two first avatars in a selectable state on an avatar selection interface, a first avatar selection control of the avatar selection controls displaying permission data of a corresponding first avatar. The processing circuitry is also configured to load a first avatar of the at least two avatars during the round in response to a selection operation on the first avatar selection control on the avatar selection interface, and update, in response to an end of the round, permission data of the first avatar associated with the avatar usage data.

In an embodiment, a non-transitory computer-readable storage medium stores computer-readable instructions thereon, which, when executed by a computer device, cause the computer device to perform a method for processing avatar usage data. The method includes querying obtained avatar usage data in response to starting of a round, the avatar usage data indicating a use permission for at least two avatars, and determining, among a plurality of avatars, at least two first avatars associated with the avatar usage data and determining permission data of the first avatars. The method also includes displaying avatar selection controls of the at least two first avatars in a selectable state on an avatar selection interface, a first avatar selection control of the avatar selection controls displaying permission data of a corresponding first avatar. The method further includes loading a first avatar of the at least two avatars during the round in response to a selection operation on the first avatar selection control on the avatar selection interface, and updating, in response to an end of the round, permission data of the first avatar associated with the avatar usage data.

BRIEF DESCRIPTION OF THE DRAWINGS

To describe technical solutions in embodiments of this application more clearly, the following briefly introduces the accompanying drawings describing the embodiments. The accompanying drawings in the following description show only some embodiments of this application, and a person of ordinary skill in the art may still derive other drawings from these accompanying drawings.

DESCRIPTION OF EMBODIMENTS

Figure 1:
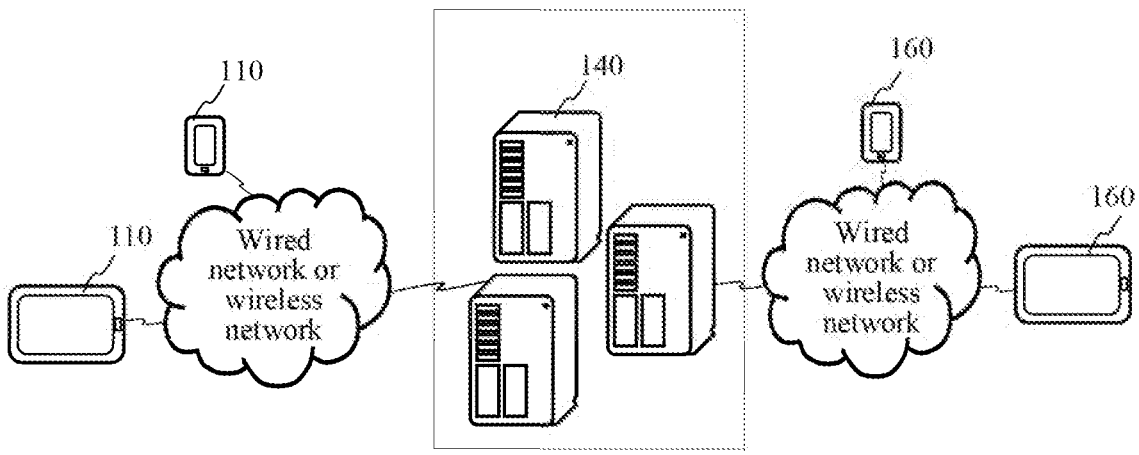
FIG. 1 is a schematic diagram of an implementation environment of a method for processing avatar usage data according to an embodiment of this application.

To make objectives, technical solutions, and advantages of this application clearer, the following further describes implementations of this application in detail with reference to the accompanying drawings.

For convenience of understanding the technical processes of the embodiments of this application, terms in the embodiments of this application are described.

Virtual scenes: a virtual scene displayed (or provided) when an application program is run on a terminal. The virtual scene may be a simulated environment of a real world, or a semi-simulated and semi-fictional virtual environment, or a purely fictional virtual environment. The virtual scene may be any one of a two-dimensional (2D) virtual scene, a 2,5-dimensional virtual scene, and a three-dimensional (3D) virtual scene. This is not limited in this application. For example, the virtual scene may include the sky, the land, the ocean, and the like. The land may include environmental elements such as the desert and a city. A user may control a virtual character to move in the virtual scene.

Virtual character: a movable object in a virtual scene. The movable object may be a virtual person, a virtual animal, or a cartoon character. The virtual character may be an avatar used for representing a user in the virtual scene. The virtual scene may include a plurality of virtual characters, and each virtual character has a shape and a volume in the virtual scene, and occupies some space in the virtual scene. Further, the virtual character may be a character controlled through operations performed on a client, or artificial intelligence (AI) set through training in a battle in a virtual environment, or a non-player character (NPC) set in a battle in a virtual scene. Further, the virtual character is a virtual person competing in a virtual scene. Further, a quantity of virtual characters in a battle in the virtual scene may be preset, or may be dynamically determined according to a quantity or clients joining the battle, which is not limited in the embodiments of this application.

Avatar: In the embodiments of this application, an avatar refers to a virtual character or a skin resource of the virtual character. The skin resource is an appearance of the virtual character. One virtual character may have different appearances, that is, have different skin resources.

Multiplayer online battle arena (MOBA) game: a game in which several forts are provided in virtual scenes, and users in different camps control virtual characters to battle in the virtual scenes, to occupy forts or destroy forts of the opposing camp. For example, in a MOBA game, users may be divided into at least two opposing camps. Different virtual teams on the at least two opposing camps occupy respective map regions, and compete against each other using specific victory conditions as goals. Each virtual team includes one or more virtual characters. The victory conditions include, but are not limited to at least one of occupying forts or destroy forts of the opposing ramps, killing virtual characters in the opposing camps, ensure own survivals in a specified scenario and time, seizing, a specific resource, and outscoring the opponent within a specified time. The MOBA arena game may take place in rounds. The same map or different maps may be used in different rounds of tactical competition. A duration of a MOBA game round is from a time point at which the game starts to a time point at which the victory condition is met.

Avatar usage data: Avatar usage data is used for indicating use permissions of at least two avatars. One piece of avatar usage data is associated with permission data of at least two avatars. For example, the permission data is a number of available experiences of an avatar or the like. In a possible implementation, the avatar usage data is in a form of a virtual prop. For example, in the embodiments of this application, the avatar usage data is in a form of an avatar experience card.

In the related art, if a user wants to experience different avatars, the user needs to collect a large quantity of different experience cards, and also needs to use the experience cards within limited experience times. If the user does not obtain an experience card of a specific avatar or an experience card of the avatar expires, the user cannot experience the avatar, and the user needs to collect experience cards again. However, collection of experience cards is relatively difficult and includes cumbersome steps. It is very likely that an avatar that a user wants to experience is inconsistent with an avatar corresponding an experience card currently owned by the user. Consequently, the user needs to spend a lot of time in collecting an experience card of a specific avatar. Such a process leads to extremely low the efficiency of human-computer interaction, and highly complex user operations.

FIG. 1 is a schematic diagram of an implementation environment of a method for processing avatar usage data according to an embodiment of this application. Referring to FIG. 1, the implementation environment includes a first terminal 110 and a server 140.

A target application program supporting display of a virtual scene and a virtual character is installed and run on the first terminal 110. The target application program may be any one of a virtual reality application program, a three-dimensional map program, a military simulation program, a role-playing game (RPG), a MOBA came, or a multiplayer gunfight survival game. The first terminal 110 is a terminal used by a first user, and the first user uses the first terminal 110 to operate a first virtual character in the virtual scene to perform a movement. The movement includes, but is not limited to, at least one of body posture adjustment, crawling, walking, running, cycling, jumping, driving, picking-sup, shooting, attacking, and throwing. For example, the first virtual character is a first virtual person, for example, a simulated person character or a cartoon person character.

The first terminal 110 is connected to the server 140 by a wireless network or a wired network.

The server 140 includes at least one of one server, a plurality of servers, a cloud computing platform, and a virtualization center. The server 140 is configured to provide a backend service for a target application program supporting a virtual scene. Further, the server 140 takes on primary computing work, and the first terminal 110 and the second terminal 160 take on secondary computing work; alternatively, the server 140 takes on secondary computing work, and the first terminal 110 and the second terminal 160 take on primary computing work; alternatively, collaborative computing is performed by using a distributed computing architecture among the server 140, the first terminal 110, and the second terminal 160.

In some embodiments, the implementation environment may further include a second terminal 160. A target application program supporting display of a virtual scene and a virtual character is installed and run on the second terminal 160. The target application program may be any one of a virtual reality application program, a three-dimensional map program, a military simulation program, an RPG, a MOBA game, or a multiplayer gunfight survival game. The second terminal 160 is a terminal used by a second user, and the second user uses the second terminal 160 to operate a second virtual character in the virtual scene to perform a movement. The movement includes, but is not limited to, at least one of body posture adjustment, crawling, walking, running, cycling, jumping, driving, picking-up, shooting, attacking, and throwing. For example, the second virtual character is a second virtual person, for example, a simulated person character or a cartoon person character.

The second terminal 160 is connected to the server 140 by a wireless network or a wired network.

Further, the first virtual character controlled by the first terminal 110 and the second virtual character controlled by the second terminal 160 are located in a same virtual scene, in this case, the first virtual character may interact with the second virtual character in the virtual scene. In some embodiments, the first virtual character and the second virtual character may be in a hostile relationship. For example, the first virtual character and the second virtual character may belong to different groups. Virtual characters in a hostile relationship may attack each other by casting different abilities, to interact with each other in a battling manner. Performance effects of triggered abilities are displayed on the first terminal 110 and the second terminal 160.

In some embodiments, the first virtual character and the second virtual character may be teammates. For example, the first virtual character and the second virtual character may belong to the same group, have a friend relationship, or have a temporary communication permission.

Further, the target application programs installed on the first terminal 110 and the second terminal 160 are the same, or the target application programs installed on the two terminals are the same type of application programs on different operating system platforms. The first terminal 110 may be generally one of a plurality of terminals, and the second terminal 160 may be generally one of a plurality of terminals. In this embodiment, the first terminal 110 and the second terminal 160 are used as examples for description. Device types of the first terminal 110 and the second terminal 160 are the same or different. The device type includes at least one of a smartphone, a tablet computer, an ebook reader, a Moving Picture Experts Group Audio Layer III (MP3) player, a Moving Picture Experts Group Audio Layer IV (MP4) player, a laptop computer, and a desktop computer. For example, the first terminal 110 and the second terminal 160 may be smartphones or other handheld portable game devices. The following embodiment is described by using an example in which the terminal includes a smartphone.

A person skilled in the art may recognize that there may be more or fewer terminals. For example, there may be only one terminal, or there may be dozens of or hundreds of terminals or more. The quantity and the device type of the terminals are not limited in the embodiments of this application.

The method for processing avatar usage data provided in the embodiments of this application max be applied to a variety of application programs. For example, the method may be applied to a MOBA game. Avatar usage data may be configured in the MOBA game. The avatar usage data may be presented in a form of an avatar experience card. One avatar experience card may correspond to a plurality of avatars. A user may select any one of the avatars to experience in a game round, and after selection of a specific avatar is confirmed, a number of experiences corresponding to the specific avatar is reduced. In a technical solution provided in the embodiments of this application, one avatar experience card is not limited to a single avatar, which extends an experience range of a user, provides the user with a larger choice space. In addition, avatars are experienced according to a number of times, to avoid the phenomenon that an experience card expires before it is fully used. The application of this solution allows a user to collect different experience cards without spending a lot time, thereby reducing complexity of user operations, and effectively improving the efficiency of human-computer interaction.

Figure 2:
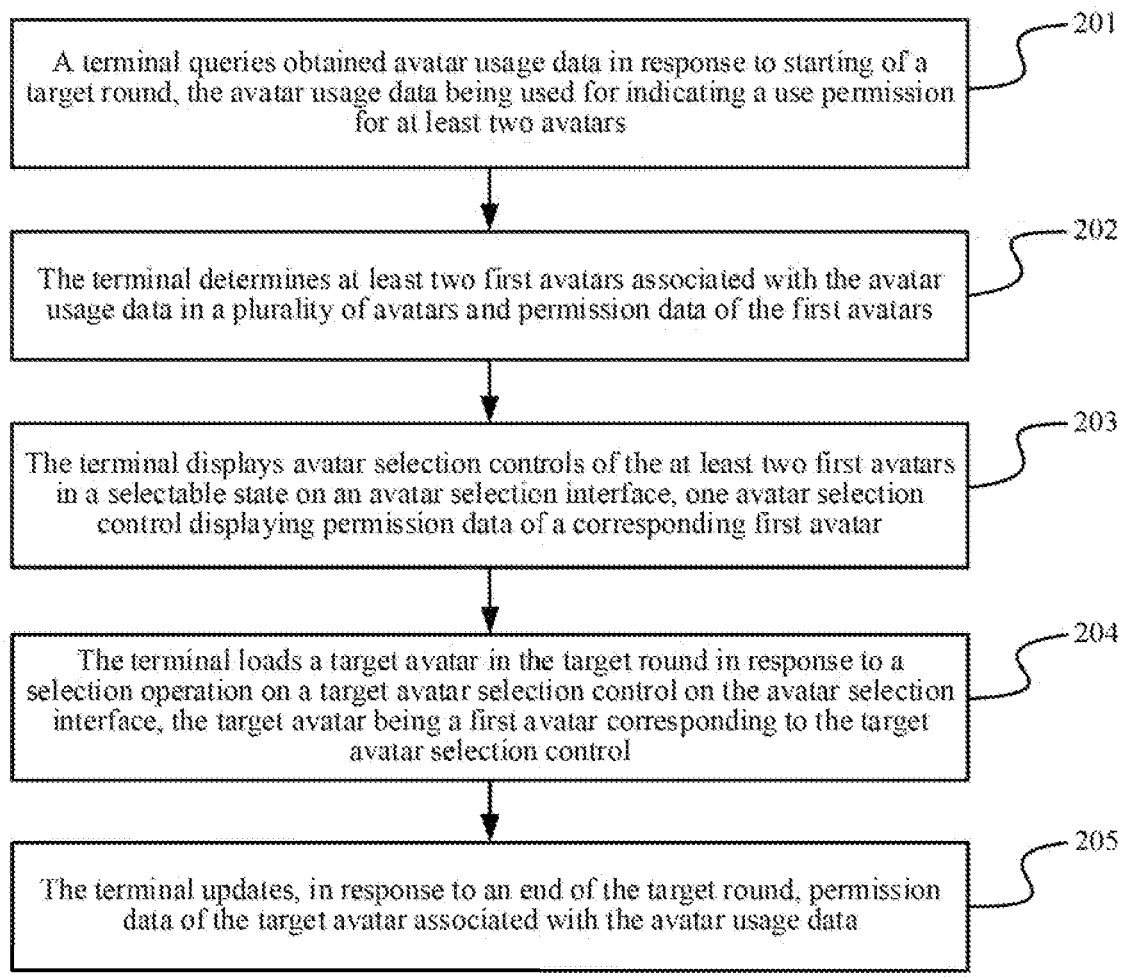
FIG. 2 is a flowchart of a method for processing avatar usage data according to a embodiment of this application.

FIG. 2 is a flowchart era method for processing avatar usage data according to an embodiment of this application. The method may be performed by any terminal in the foregoing implementation environment. In the embodiments of this application, with reference to FIG. 2, the method for processing avatar usage data is briefly described by using a terminal as an execution entity.

In step 201, a terminal queries obtained avatar usage data in response to starting of a target round, the avatar usage data being used for indicating a use permission for at least two avatars.

The terminal may be a terminal used by any user. A user account is logged into a target application program run on the terminal. The obtained avatar usage data is avatar usage data that has been bound to the user account in the target application program. The avatar usage data is used for indicating use permissions to at least two avatars. For example, the avatar usage data is associated with permission data of at least two avatars. The permission data is a number of available experiences of an avatar or the like.

In some embodiments, in response to the user starting a target round in the target application program, for example starting a competitive battle, the terminal triggers an avatar selection function and queries avatar usage data that has been bound to a user account of the user. In some embodiments, in response to the user starting the target application program, the terminal automatically triggers to start a target round. In some embodiments, the terminal displays a first graphical user interface, and determines that the user starts a target round in response to detecting a start operation on the first graphical user interface. The first graphical user interface may be a start preparation interface, and the first graphical user interface may display a start confirmation control for providing a game start function. The start operation can be a trigger operation performed by the user on the start confirmation control. In response to detecting the start operation of the user, the terminal can confirm that the user starts the target round, that is, confirm that the user enters a game round. The trigger operation may be a click/tap operation, a press-and-hold operation, or the like, which is not limited in the embodiments of this application. Specific forms of the first graphical user interface and the start operation are not limited in the embodiments of this application.

In the embodiments of this application, a plurality of avatars may be set in the target application program for the user to select. The avatar may be a virtual character or a skin resource of the virtual character. The skin resource is an appearance of the virtual character. One virtual character may have different appearances, that is, have different skin resources. For example, the avatar usage data may be presented in a form of an avatar experience card in the target application program. The user may apply the avatar experience card, to try an avatar that the user does not have. With regard to the avatar that the user does not have, after obtaining the experience card of the avatar, the user may have a limited use qualification for the avatar. Generally, the limited use qualification may be set as using the avatar a limited number of times, for example, the avatar can only be used three times. Using an example in which this solution is applied to a MOBA game, after obtaining an avatar experience card, the user may select any hero or skin indicated by the avatar experience card to experience. Hero refers to a virtual character provided by the MOBA game for the user to use.

In a possible implementation, in response to the user starting the target round, the terminal may obtain user data of the user front a server. The user data may include a data identifier of avatar usage data that the user owns, character identifiers of virtual diameters that the user owns, and the like. The terminal may determine, based on the user data, avatar usage data that has been bound to the user account.

In step 202, the terminal determines at least two first avatars associated with the avatar usage data in a plurality of avatars and permission data of the first avatars.

In a possible implementation, the terminal may store a first configuration file corresponding to the avatar usage data. The first configuration file is used for storing configuration information of the avatar usage data. For example, the configuration information may include avatar identifiers of a plurality of avatars associated with the avatar usage data, permission data associated with the avatar identifiers, and the like. The terminal may determine, based on the avatar identifiers in the configuration information, avatars indicated by the avatar identifiers in the plurality of avatars as the first avatars and determine permission data associated with the avatar identifiers as the permission data of the first avatars.

The foregoing description on the method for determining the first avatars and the permission data is merely an exemplary description. Use of a specific method for determining the first avatars and the permission data is not limited in the embodiments of this application.

In step 203, the terminal displays avatar selection controls of the at least two first avatars in a selectable state on an avatar selection interface, a first avatar selection control displaying permission data of a corresponding first avatar.

Figure 3:
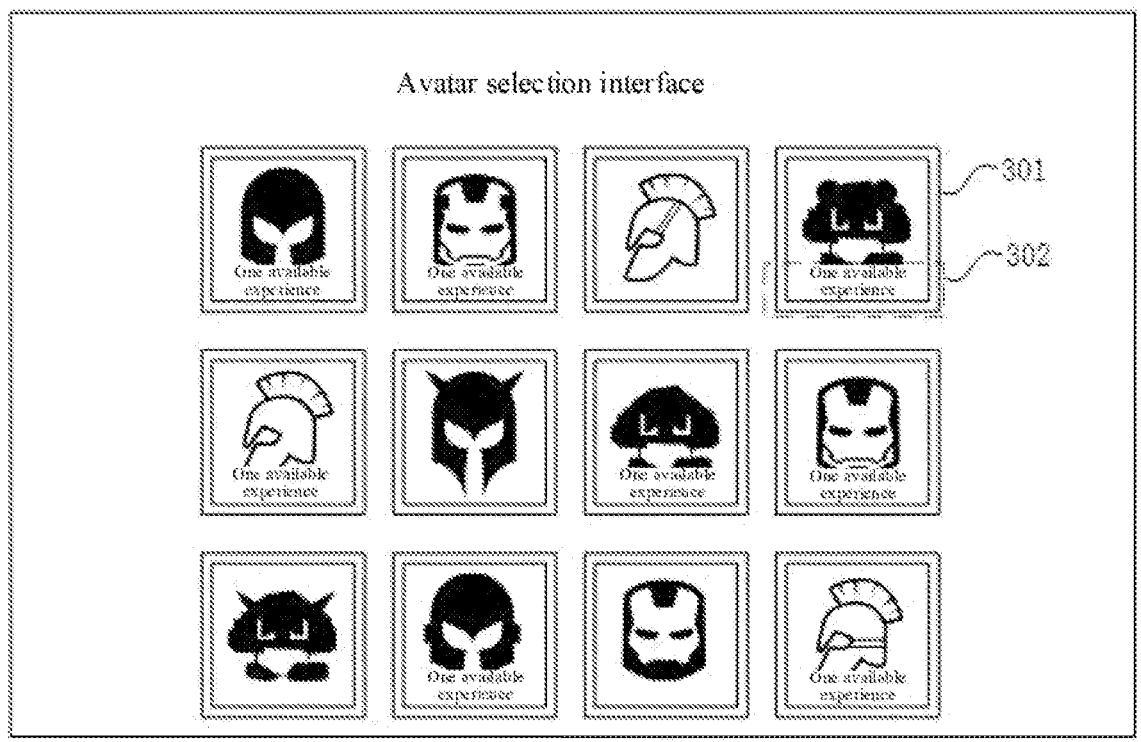
FIG. 3 is a schematic diagram of an avatar selection interface according to an embodiment of this application.

The avatar selection interface may provide a function of selecting an avatar, that is, provide a function of selecting a virtual character or a skin resource. FIG. 3 is a schematic diagram of an avatar selection interface according to an embodiment of this application. Referring to FIG. 3, the avatar selection interface may display avatar selection controls 301 of a plurality of avatars. The avatar selection control 301 is displayed in a selectable state. The avatar selection interface may further display permission data 302 corresponding to the avatars. A specific display mode of the avatar selection interlace is not limited in the embodiments of this application.

In step 204, the terminal loads a target avatar in the target round in response to a selection operation on a target avatar selection control on the avatar selection interface, the target avatar being a first avatar corresponding to the target avatar selection control.

The target round may be a game round in which the user currently participates.

In a possible implementation, after detecting that the user selects the target avatar selection control on the avatar selection interface, the terminal may display a virtual scene corresponding to the target round, and display a target avatar corresponding to the target avatar selection control in the virtual scene. For example, when the target avatar corresponds to a specific hero, the terminal may display the hero in the virtual scene, and when the target avatar corresponds to a specific skin resource of the hero, the terminal may display an appearance indicated by the skin resource as an appearance of the hero in the virtual scene.

In step 205, the terminal updates, in response to an end of the target round, permission data of the target avatar associated with the avatar usage data.

In a possible implementation, when the target round ends, the terminal may update the permission data of the target avatar, and synchronize the updated permission data to the server. The server updates the user data. Certainly, the terminal may alternatively perform the step of updating the permission data and the data synchronization step after the user completes selection of the target avatar, which is not limited in the embodiments of this application. Using an example in which the permission data is a number of available experiences of the avatar, updating the permission data is reducing the number of available experiences of the avatar.

In a technical solution provided in the embodiments of this application, avatar usage data that has been bound to a user account is queried, to determine at least two first avatars associated with the avatar usage data and permission data of the first avatars. That is, the user has a piece of avatar usage data, so as to experience a plurality of avatars. If the user selects a target avatar from the plurality of avatars, the target avatar is loaded in the target round, and the permission data of the target avatar associated with the avatar r usage data is updated. Through application of the foregoing solution, the user does not need spend a lot time in collecting different usage data when the user wants to experience different avatars, thereby reducing complexity of user operations, simplifying operation steps of the user, and effectively improving, the efficiency of human-computer interaction.

Figure 4:
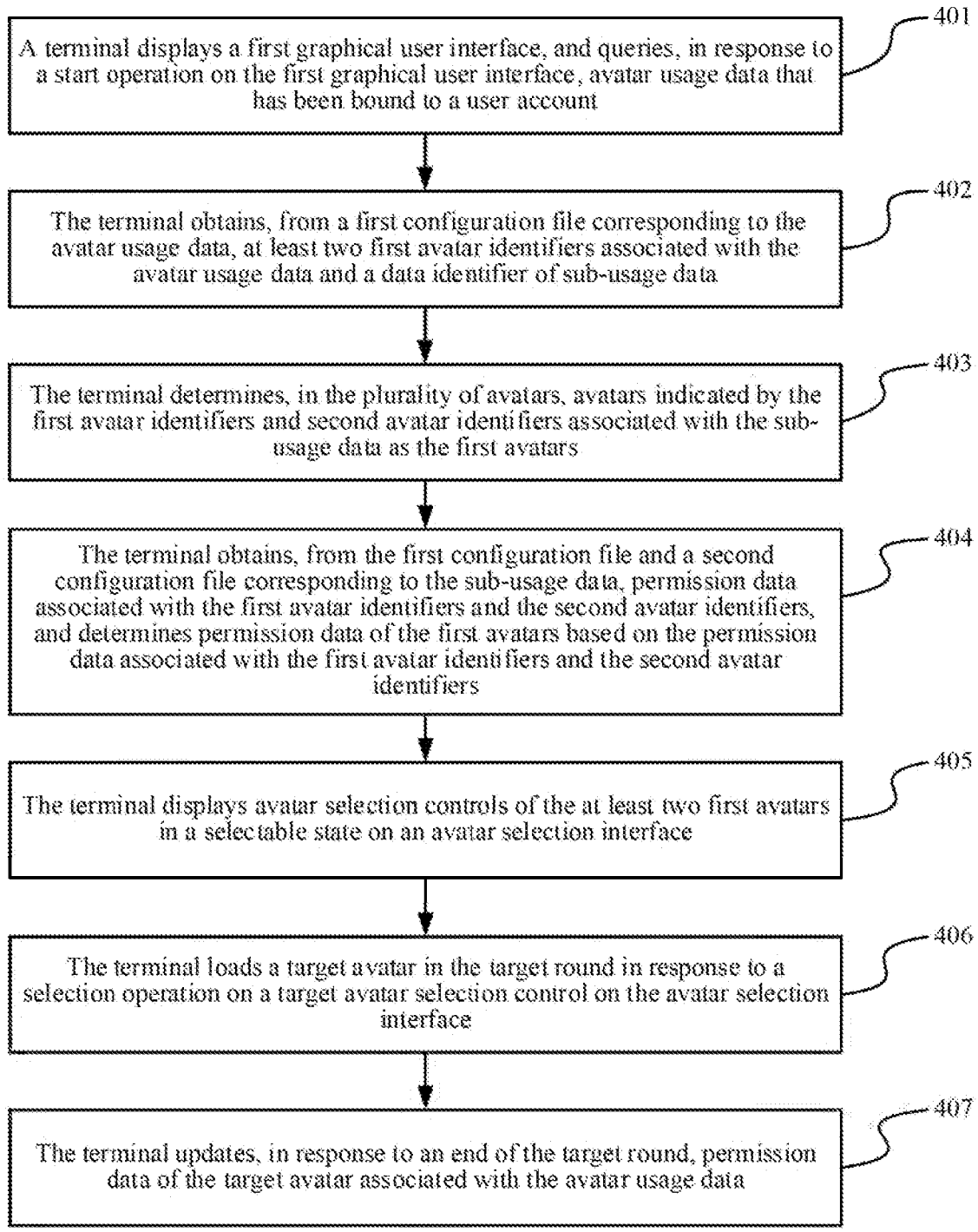
FIG. 4 is a flowchart of a method for processing avatar usage data according to an embodiment of this application.

The method for processing avatar usage data provided in this application is briefly described in the foregoing embodiment, and the method is described in detail below with reference to FIG. 4. FIG. 4 is a flowchart of a method for processing avatar usage data according to an embodiment of this application. The method may be applied to the implementation environment shown in FIG. 1. Referring to FIG. 4, the embodiment may further include following steps.

In step 401, a terminal displays a first graphical user interface, and queries, in response to a start operation on the first graphical user interface, avatar usage data that has been bound to a user account.

The first graphical user interface may be a start preparation interface. A uses may enter a target round through the first graphical user interface, that is, enter a game round. Using an example in which this solution is applied to a MOBA game, in a possible implementation, the first graphical user interface may be a game lobby interface. The game lobby interface may display a start confirmation control, and the start operation may be a trigger operation on the start confirmation control. When detecting that the user performs a trigger operation on the start confirmation control, the terminal may perform the step of querying avatar usage data that has been bound to the user account. In a possible implementation, the first graphical user interface may be team-up interface, that is, a plurality of users are grouped into a group, so as to participate in a game. The team-up interface may display a team-up confirmation control. The start operation may be a trigger operation on the team-up confirmation control. After detecting that the user performs a trigger operation on the team-up confirmation control, that is, determining that team-up of the user is completed, the terminal may perform the step of querying avatar usage data that has been bound to the user account. The foregoing description on the first graphical user interface and the start operation is merely an exemplary description. Specific forms of the first graphical user interface and the start operation are not limited in the embodiments of this application.

In a possible implementation, after detecting a start operation of the user, the terminal may obtain user data of the user from the server based on an account identifier of the user. The user data may include a data identifier of avatar usage data that the user owns and the like, which is not limited in the embodiments of this application. Certainly, the terminal may alternatively obtain, when the target application program starts and detects that the user logs in, user data of the user from the server based on an account identifier of a user account that currently logs in. A specific obtaining occasion and a specific obtaining manner of the user data are not limited to the embodiments of this application.

Step 401 is a possible implementation of querying, by the terminal in response to the user starting the target round, avatar usage data that has been bound to the user account of the user. The detecting a start operation on the first graphical user interface is that the terminal signals that the user starts the target round. In some embodiments, in response to the user starting the target application program, the terminal may alternatively automatically trigger to start a target round.

In step 402, the terminal obtains, from a first configuration file corresponding to the avatar usage data, at least two first avatar identifiers associated with the avatar usage data and a data identifier of sub-usage data.

In this embodiment of the application, a piece of avatar usage data may be associated with a plurality of first avatar identifiers, or may be associated with data identifiers of other avatar usage data. The other avatar usage data is sub-usage data. The sub-usage data may be associated with at least two second avatar identifiers. The second avatar identifiers are different from the first avatar identifiers. The first avatar identifier, the data identifier, the permission data, and the like associated with the avatar usage data may be used as configuration information of the avatar usage data and stored in the configuration file. For example, the configuration information of the avatar usage data is stored in the first configuration file. Configuration information of the sub-usage data and the configuration information of the avatar usage data may be stored in a same configuration file or different configuration files, which is not limited in the embodiments of this application. In this embodiment of this application, descriptions are made by using an example in which the configuration information of the sub-usage data is stored in a second configuration file.

In a possible implementation, the first avatar identifiers and the data identifier associated with the avatar usage data may constitute an experience group. That is, one piece of avatar usage data may correspond to one experience group. The data identifier of the avatar usage data may be used as a group identifier of the experience group. The experience group may include a plurality of first avatar identifiers, or may include a plurality of first avatar identifiers and data identifiers of at least one piece of sub-usage data. In a possible implementation, one piece of sub-usage data corresponds to one experience group. An identifier of the sub-usage data may be used as a group identifier of a corresponding sub-experience group. That is, one experience group may include a plurality of first avatar identifiers and a group identifier of at least one sub-experience group.

Figure 5:
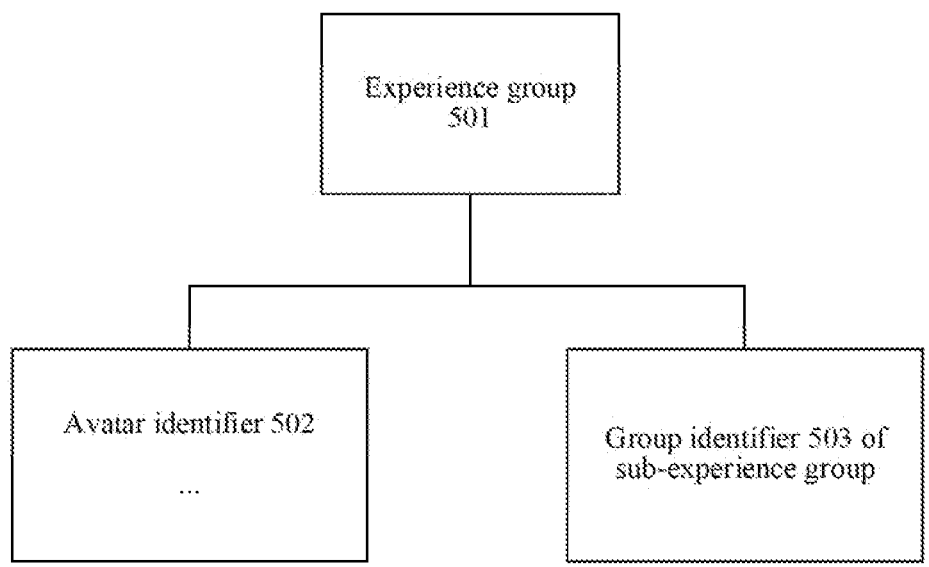
FIG. 5 is a schematic diagram of a data structure of an experience group according to an embodiment of this application.

FIG. 5 is a schematic diagram of a data structure of air experience group according to an embodiment of this application. Referring to FIG. 5, an experience group 501 corresponding to avatar usage data includes a plurality of avatar identifiers 502. The experience group 501 may be nested with a sub-experience group. That is, the experience group 501 further includes a group identifier 503 of the sub-experience group. In a possible implementation, a quantity of avatar identifiers included in an experience group may be limited. That is, a quantity of avatars associated with avatar usage data is limited. For example, a quantity of avatar identifiers included in an experience group needs to be less than or equal to a target threshold. The target threshold may be set by development personnel, for example, may be set to 20, which is not limited in the embodiments of this application. In a possible implementation, configuration information of each piece of avatar usage data may be stored in a configuration file in a form of an experience group. For example, data of an experience group corresponding to the avatar usage data may be stored in the first configuration file. Data of a sub-experience group corresponding to the sub-usage data may be stored in the second configuration file. Storing configuration information of the avatar usage data in a form of an experience group helps to determine a nesting relationship between pieces of avatar usage data, and helps to manage the configuration information of the avatar usage data.

In this embodiment of this application, avatar usage data is associated with a plurality of avatar identifiers and a data identifier of sub-usage. The avatar usage data may be associated with only the plurality of avatar identifiers, or only the data identifier of the sub-usage data, which is not limited in the embodiments of this application.

In step 403, the terminal determines, in the plurality of avatars, avatars indicated by the first avatar identifiers and the second avatar identifiers associated with the sub-usage data as the first avatars.

Figure 6:
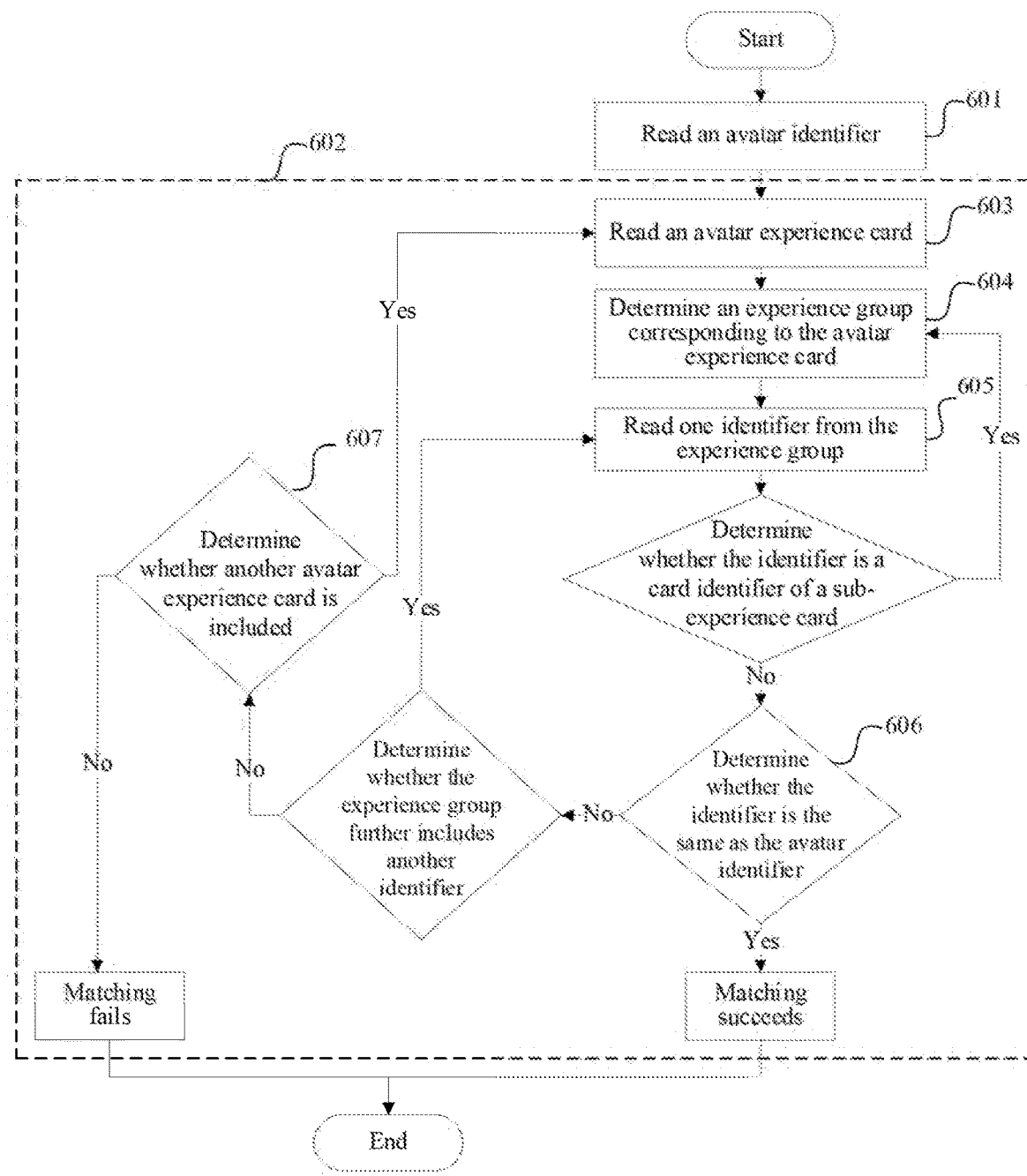
FIG. 6 is a flowchart of a method for determining a first avatar according to an embodiment of this application.

In a possible implementation, the terminal may traverse, based on as third avatar identifier of a third avatar in the plurality of avatars, the at least two first avatar identifiers associated with the avatar usage data, determine the third avatar as the first avatar in response t a determination that any first avatar identifier is the same as the third avatar identifier, traverse the at least two second avatar identifiers associated with the sub-usage data in response to a determination that none of the first avatar identifiers is the same as the third avatar identifier, and determine the third avatar as the first avatar in response to a determination that any second avatar identifier is the same as the third avatar identifier. Otherwise, matching of the any avatar fails, the any avatar cannot be used as the first avatar. FIG. 6 is a flowchart of a method for determining a first avatar according to an embodiment of this application. With reference to FIG. 6, the method for determining a first avatar is specifically described by using an example in which this solution is applied to a MOBA game, and the avatar usage data is presented as an avatar experience card. The terminal ma perform step 601 of reading an avatar identifier to obtain an avatar identifier S of any avatar in the plurality of avatars, and perform step 602 of traverse avatar experience cards based on the virtual identifier S. In some embodiments, the terminal may perform step 603 of reading an avatar experience card and step 604 of determining an experience group corresponding to the avatar experience card, and then perform step 605 of reading an identifier from the experience group, to obtain an identifier A and determine whether the identifier A is a card identifier of a specific sub-experience card; if yes, perform step 604 again based on the identifier A; if not, determine that the identifier A is an avatar identifier of a specific avatar, and perform step 606 of determining whether the identifier A is the same as the avatar identifier S; if yes, determine that the matching succeeds, and determine the any avatar as the first avatar; if not, determine whether the experience group further includes another identifier; if the experience group further includes another identifier B, re-perform step 605 of reading an identifier, to perform a subsequent determining step based on the identifier B that is read; if the experience group does not include another identifier, perform step 607 of determining whether another avatar experience card is included; and if another avatar experience card is included, perform step 603 again, and if no other avatar experience card is included, determine that the matching fails, and the any avatar cannot be used as the first avatar.

In a possible implementation, the terminal may further filter the plurality of avatars, to obtain, from the plurality of avatars set in the target application program, avatars that are not bound to the user account, and perform, based on any of the avatars that are not bound, an operation of traversing the at least two first avatar identifiers associated with the avatar usage data. Through application afire foregoing solution, avatars are filtered, so that only far an avatar that the user does not own, whether the user has an experience qualification for the avatar is determined, to lower an amount of computation of the terminal.

In step 404, the terminal obtains, from the first configuration file and a second configuration file corresponding to the sub-usage data, permission data associated with the first avatar identifiers and the second avatar identifiers, and determines the permission data of the first avatars based on the permission data associated with the first avatar identifiers and the second avatar identifiers.

In a possible implementation, after determining that an avatar is a first avatar, the terminal may determine permission data corresponding to the first avatar based on configuration information stored in the configuration file. Using an example in which the terminal determines an avatar indicated by a first avatar identifier as a first avatar, the terminal may obtain, from the first configuration file, permission data associated with the first avatar identifier as permission data of the first avatar. The foregoing description on the method for determining permission data of the first avatar is merely an exemplary description. Use of a specific method for determining the permission data is not limited in the embodiments of this application.

Step 402 to step 404 are s of determining at least two first avatars associated with the avatar usage data in a plurality of avatars and permission data of the first avatars. In this embodiment of this application, one piece of avatar usage data may provide a function of experiencing a plurality of avatars, to broaden a selection range of the user and provide the user with a free choice, so that the user does not need spend a lot time in collecting, different avatar usage data when the user wants to experience different avatars, thereby reducing complexity of operations of the user in a game preparation phase, saving an operation time of the user, simplifying operation steps of the user, and improving the efficiency of human-computer interaction.

In step 405, the terminal displays avatar selection controls of the at least two first avatars in a selectable state on an avatar selection interface.

In a possible implementation, the terminal may display, in a table state, an avatar selection control of the first avatar and avatar selection controls corresponding to avatars that have been bound to the user account, and the terminal may display selection controls of other avatars, that is, avatar selection controls of avatars that are not bound to the user account and for which the user does not have an experience qualification, in an unselectable state. The avatar selection controls in a selectable state are colored, and the avatar selection control in an unselectable state are gray. Further, a target identifier may be displayed on an avatar selection control in a selectable state, and the target identifier is not displayed on an avatar selection control in an unselectable state. The target identifier may be set by development personnel, for example, the target identifier is a text identifier, a graphic identifier, or the like, which is not limited in the embodiments of this application. Certainly, the terminal may not display an avatar selection control of an avatar that is not bound to the user account and for which the user does not have an experience qualification. A specific mode of displaying an avatar selection control is not limited in the embodiments of this application. In this embodiment of this application, permission data may be displayed at a target position of an avatar selection control. The target position may be set by development personnel, which is not limited in the embodiments of this application. Using the avatar selection interface shown in FIG. 3 as an example, the target position may be a position in a lower region of the avatar selection control.

In a possible implementation, before traversing the avatar usage data that has been hound to the user account, the terminal may create a target temporary file. The target temporary file may be used for storing an avatar identifier of the first avatar and permission data of the first avatar. Data in the target temporary file may be stored in a dictionary structure. For example, the avatar identifier may be used as a key element (key), and the permission data may be used as a value element (value). Certainly, the data in the target temporary file may alternatively be stored in another structure, which is not limited in the embodiments of this application. The terminal performs, based on the target temporary file, a subsequent step of displaying an avatar selection interface. That is, the terminal obtains the avatar identifiers and the permission data associated with the avatar identifiers from the target temporary file in response to displaying of the avatar selection interface, display, on the avatar selection interface in a selectable state, the avatar selection controls of the first avatars indicated by the avatar identifiers, and display the permission data at target positions of the avatar selection controls. In this embodiment of this application, a target temporary file is created to store the avatar identifier in association with the permission data, to facilitate querying of data. When the avatar selection interface is displayed based on the target temporary file, a plurality of first avatars that the user can experience and permission data corresponding to the first avatars can be accurately determined.

In step 406, the terminal loads a target avatar in the target round in response to a selection operation on a target avatar selection control on the avatar selection interface.

The target avatar is a first avatar corresponding to the target avatar selection control.

Figure 7A:
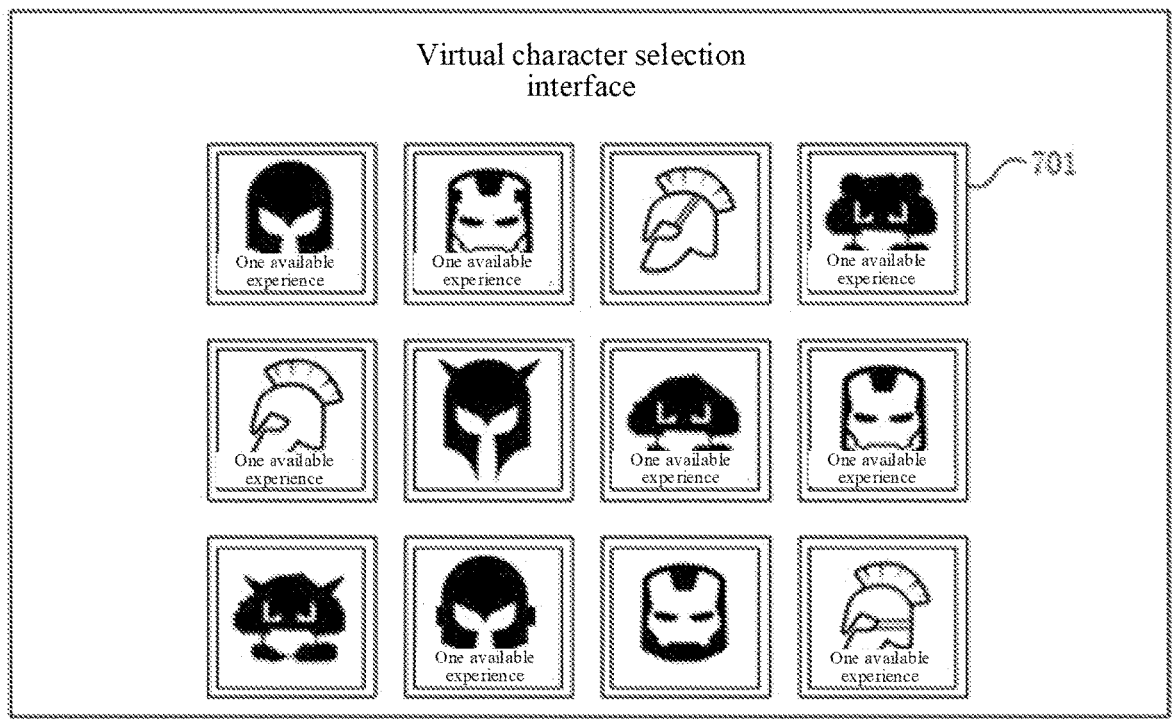
FIGS. 7(a) and 7(b) are schematic diagrams of an avatar selection interface according to an embodiment of this application.
Figure 7B:
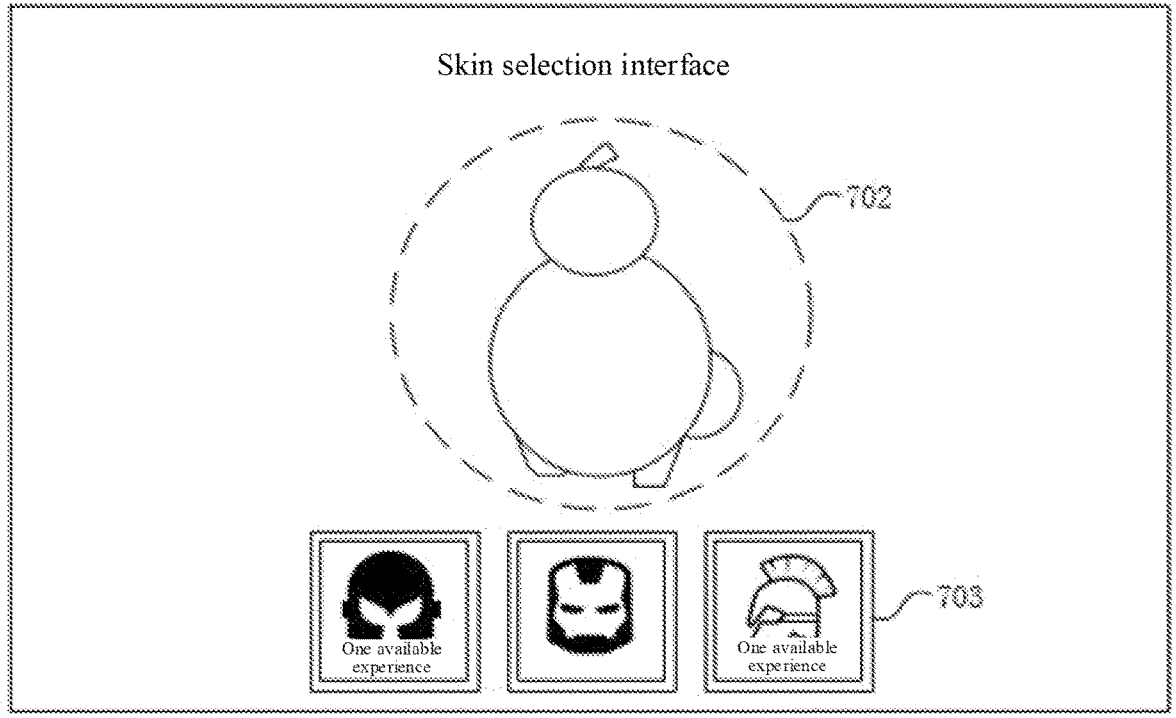

In this embodiment of this application, the terminal may detect a selection operation of the user on the avatar selection interface, determine, based on a target avatar selection control selected by the user, a target avatar indicated by the target avatar selection control, and display, when the user enters a target round, the target avatar in a virtual scene corresponding to the target round. In a possible implementation, the user may select a virtual character and a skin resource respectively in different interfaces, that is, the avatar selection interface may include a virtual character selection interface and a skin resource selection interface. The virtual character selection interface may provide virtual characters, that is, the virtual character selection interface is used for providing a function of selecting a hero. The skin resource selection interface may provide a function of selecting a skin of a specific hero. The terminal may determine the target avatar based on selection operations of the user on the virtual character selection interface and the skin resource selection interface. In some embodiments, the foregoing avatar selection process is described by using an example in which this solution is applied to MOBA game. FIG. 7 is a schematic diagram of an avatar selection interface according to an embodiment of this application. Referring to figure (a) in FIG. 7, the virtual character selection interface may display a plurality of avatar selection controls 701. In the virtual character selection interface, one avatar selection control 701 may indicate one virtual character, that is, one hero. After detecting a selection operation performed by the user on any virtual character, that is, any hero, in the virtual character selection interface, the terminal may display a skin selection interface corresponding to the virtual character. Referring to figure (b) in FIG. 7, the skin resource selection interface may display an image 702 of a virtual character and a plurality of avatar selection controls 703. In the skin selection interface, one avatar selection control 703 may indicate one skin resource. Avatar selection controls corresponding to skin resources that the user owns or for which the user has an experience qualification may be displayed in a selectable state, and other avatar selection controls are displayed in a locked state, that is, an unselectable state. Certainly, on an avatar selection control of a skirt resource liar which the user has an experience qualification, permission data corresponding to the skin resource may be father displayed. The user may select any skin resource in a selectable state on the skin selection interface. Certainly, the user may alternatively not select a skin resource, that is, use a skin resource a default state, which is not limited in the embodiments of this application. The terminal may display, in the target round, an avatar indicated by the selected hero or skin resource.

In step 407, the terminal updates, in response to an end of the target round, permission data of the target avatar associated with the avatar usage data.

Using an example in which permission data is a number of available experiences of an avatar, in a possible implementation, when the target round ends, the terminal may deduct one from the number of available experiences of the target avatar, and synchronize the number of available experiences after the deduction to the server. The server updates the user data. Certainly, the terminal may alternatively perform the step of reducing the number of available experiences and the data synchronization step after the user completes selection of the target avatar, which is not limited in the embodiments of this application. In this embodiment of this application, storing the permission data corresponding to the avatar cart ensure security of data, to prevent the data from being tampered with.

Figure 8:
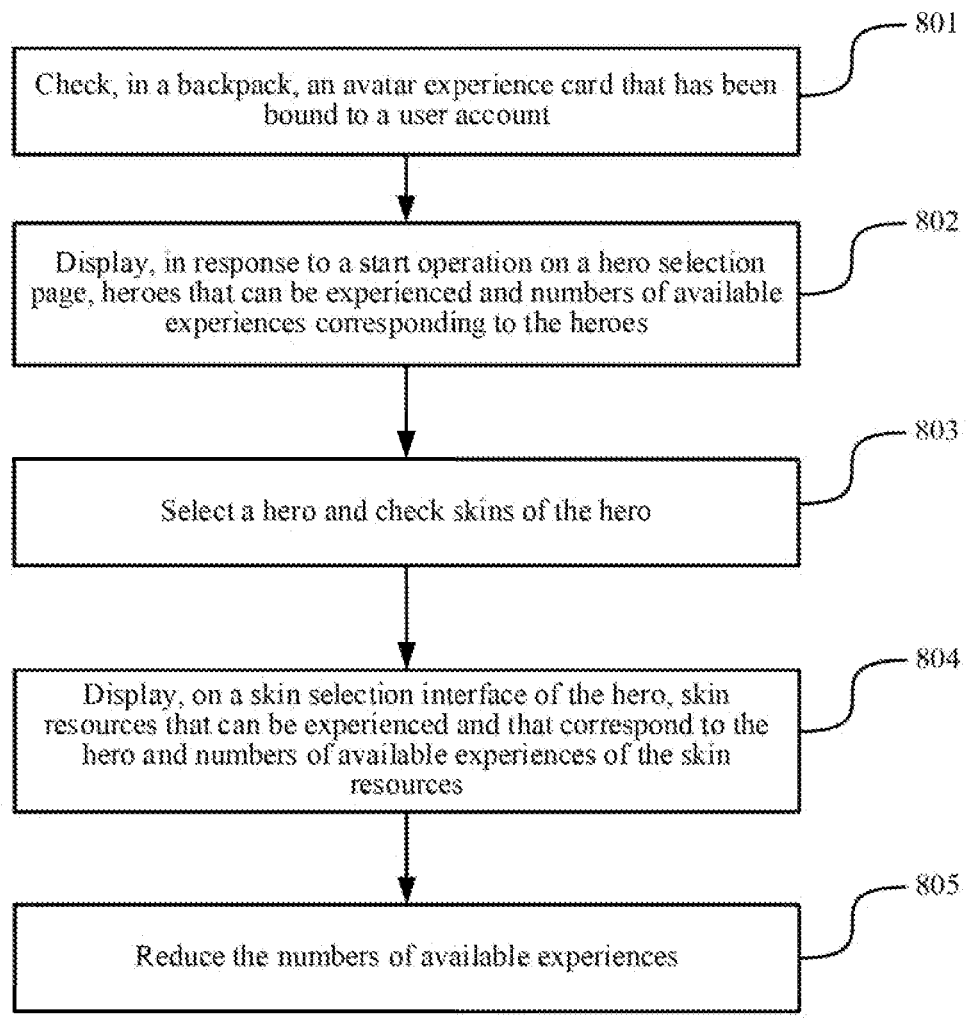
FIG. 8 is a flowchart of a method for experiencing an avatar according to an embodiment of this application.

FIG. 8 is a flowchart of a method for experiencing an avatar according to an embodiment of this application. With reference to FIG. 8, the method for experiencing an avatar is described by using an example in which this method is applied to a MOBA game, the avatar usage data is presented as an avatar experience card, and the permission data is a number of available experiences of the avatar. First, the terminal may perform step 801 of checking, in a backpack, an avatar experience card that has been bound to a user account and step 802 of displaying, in response to a start operation, heroes that can be experienced and numbers of available experiences corresponding to the heroes on a hero selection interface; then, the terminal performs, based on a selection operation of a user, step 803 of selecting a hero and checking hero skins, and displays, on a skin selection interface of the hero, skin resources that can be experienced and that correspond to the hero and numbers of available experiences of the skin resources, that is, performs step 804; and finally, after the user completes selection of the hero and the skin resource, the terminal may perform step 805 of reducing the numbers of available experiences.

In a technical solution provided in the embodiments of this application, avatar usage data that has been bound to a user account is queried, to determine at least two First avatars associated with the avatar usage data and permission data of the first avatars. That is, the user has a piece of avatar usage data, so as to experience a plurality of avatars. If the user selects a target avatar from the plurality of avatars, the target avatar is loaded in the target round, and the permission data of the target avatar associated with the avatar usage data is updated. Through application of the foregoing solution, the user does not need spend a lot tune in collecting different usage data when the user wants to experience different avatars, thereby reducing complexity of user operations, reducing operation steps of the user in experiencing different avatars, and effectively improving the efficiency of human-computer interaction.

Figure 9:
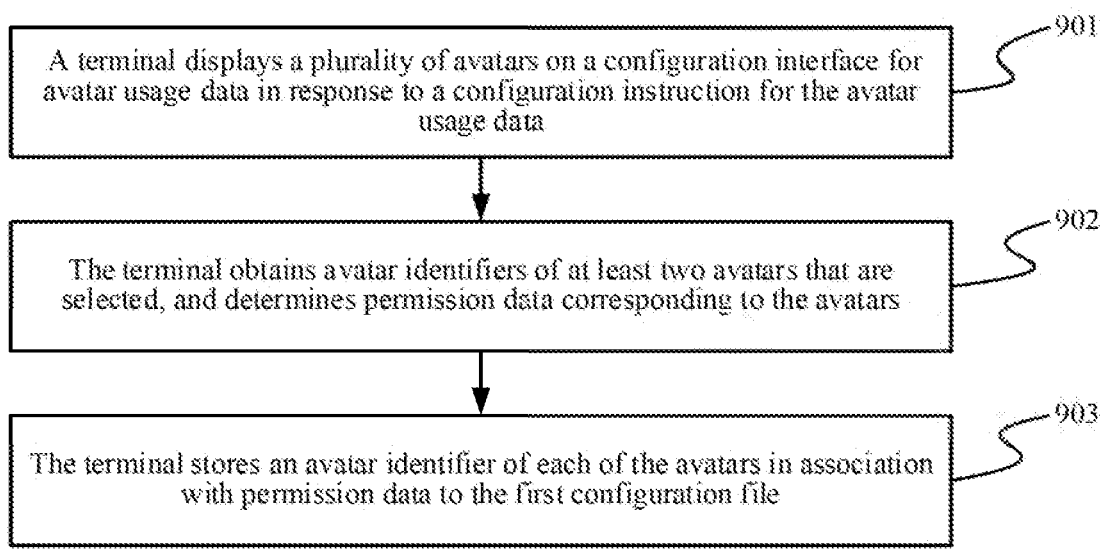
FIG. 9 is a flowchart of a method for configuring avatar usage data according to an embodiment of this application.

The foregoing embodiment describes a process of experiencing, based on a plurality of avatars associated with avatar usage data, a specific avatar in the plurality of avatars. In a possible implementation, the at least two avatars associated with the avatar usage data may be configured by a user. FIG. 9 is a flowchart of a method for configuring avatar usage data according to an embodiment of this application. Referring to FIG. 9, the embodiment may specifically include following steps:

In step 901, a terminal displays a plurality of avatars on a configuration interface for avatar usage data in response to a configuration instruction for the avatar usage data.

Figure 10:
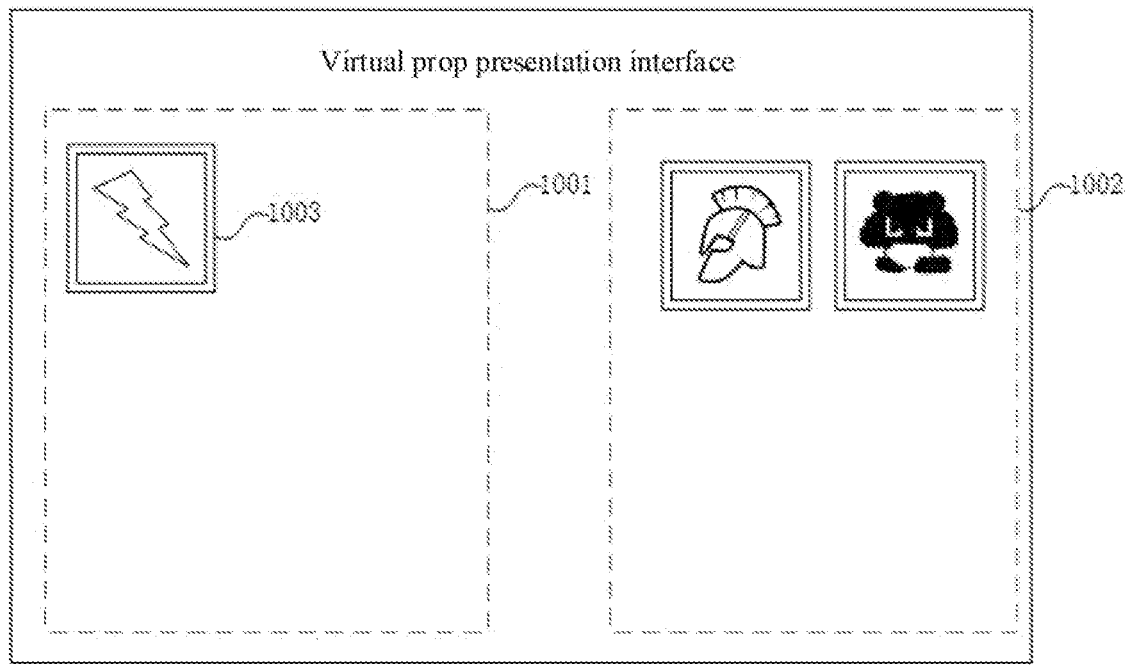
FIG. 10 is a schematic diagram of a virtual prop presentation interface according to an embodiment of this application.

In a possible implementation, the terminal may display a virtual prop presentation interface. The virtual prop presentation interface may display an icon of avatar usage data bound to a user account. FIG. 10 is a schematic diagram of a virtual prop presentation interface according to an embodiment of this application. Referring to FIG. 10, the virtual prop presentation interface may include a prop icon display region 1001 and a prop information display region 1002. An icon 1003 of avatar usage data may be displayed in the prop icon display region 1001. When detecting that a user clicks or taps an icon of any piece of avatar usage data, a terminal may display information of the avatar usage data in the prop information display region 1002, for example, may display images of avatars associated with the avatar usage data, which is not limited in the embodiments of this application.

In a possible implementation, a configuration control corresponding to the avatar usage data is further displayed on the virtual prop presentation interface. A click or tap operation performed by the user on the configuration control corresponding to the avatar usage data may trigger the configuration instruction, and the terminal may display a configuration interface corresponding to the avatar usage data. In this embodiment of this application, the configuration interface may provide a function of configuring avatars associated with the avatar usage data. In a possible implementation, avatar selection controls of a plurality of avatars are displayed on the configuration interface. The plurality of avatars may be all or some avatars set in the target application program. For example, one piece of avatar usage data may correspond to a selection range, the selection range may include some avatars, and the user may configure the avatar usage data within the selection range. Specific display content of the configuration interface is not limited in the embodiments of this application. The configuration instruction may alternatively be triggered in another manner. For example, the configuration instruction may be triggered by a press-and-hold operation performed by the user on an icon of is specific piece of avatar usage data. A specific triggering manner of the configuration instruction is not limited in the embodiments of this application.

In step 902, the terminal obtains avatar identifiers of at least two avatars that are selected, and determines permission data corresponding to the avatars.

In a possible implementation, the terminal may use avatars selected by the user on the configuration interface as avatars associated with the avatar usage data, and obtain avatar identifiers of the selected avatars. In this embodiment of this application, a quantity, range may alternatively be set, and a quantity of avatars selected by the user needs to fall within the quantity range. In a possible implementation, the terminal may alternatively assign permission data for the at least two avatars based on a total usage count corresponding to the avatar usage data. The total usage count may be set by development personnel. Permission data corresponding each avatar may be randomly assigned by the terminal or may be set by the user. For example, if a total usage count corresponding to the avatar usage data is 9, and the user selects three avatars, a sum of numbers of times that the user can assign permission data for the avatars cannot be greater than 9.

In step 903, the terminal stores an avatar identifier of each of the avatars in association with permission data to the first configuration file.

In this embodiment of this application, after determining that the user completes configuration of the avatar usage data, the terminal may store configuration information provided by the user, that is, avatar identifiers of avatars selected by the user and permission data corresponding to the avatars, to a first configuration file corresponding to the avatar usage data.

Through application of the foregoing solution, the user may configure, based on avatar usage habits, avatars associated with the avatar usage data without spending a lot of time in collecting different avatar usage data. Such an avatar usage data configuration manner, on the one hand, enlarges an avatar selection range of the user, to allow the user to sufficiently use the avatar usage data, and on the other hand, simplifies operation steps of the user in the game preparation phase, thereby improving the efficiency of human-computer interaction and improving user experience.

All of the above technical solutions may be combined to form various embodiments of this application. Details are not described herein again.

Figure 11:
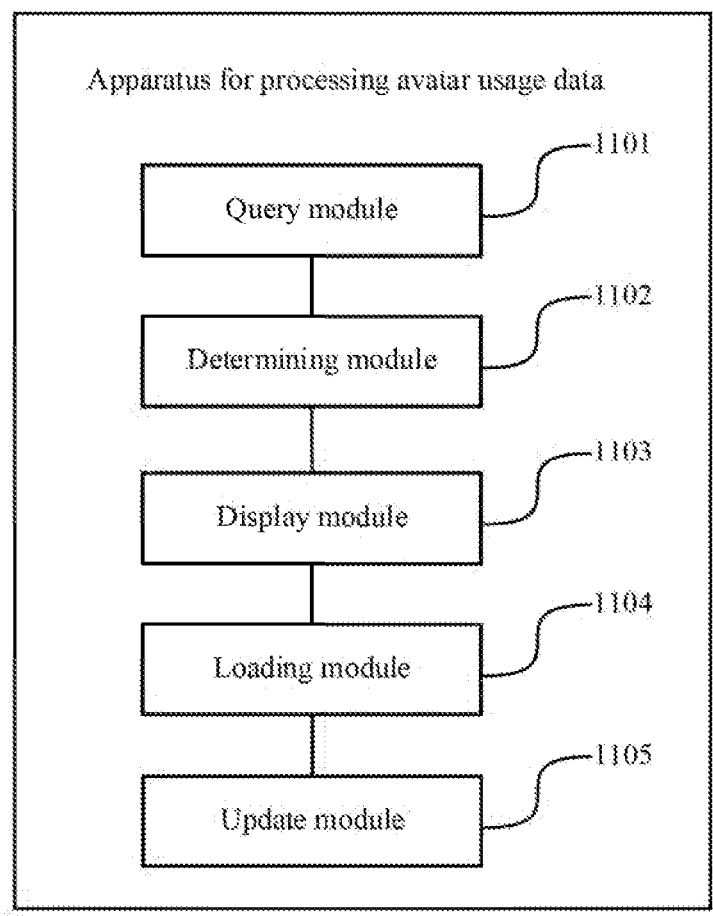
FIG. 11 is a schematic structural diagram of an apparatus for processing avatar usage data according to an embodiment of this application.

FIG. 11 is a schematic structural diagram of an apparatus for processing avatar usage data according to an embodiment of this application. Referring to FIG. 11, the apparatus includes: a query module 1101, configured to query, in response to a user starting a target round, avatar usage data that has been bound to a user account of the user, the avatar usage data being used to provide a function of experiencing at least two avatars; a determining module 1102, configured to determine at least two first avatars associated with the avatar usage data in a plurality of avatars and permission data of the first avatars; a display module 1103, configured to display avatar selection controls of the at least two first avatars in a selectable state of an avatar selection interface, one avatar selection control displaying permission data of a corresponding first avatar; a loading module 1104, configured to load a target avatar in the target round in response to a selection operation on a target avatar selection control on the avatar selection interface, the target avatar being a first avatar corresponding to the target avatar selection control; and an update module 1105, configured to update, in response to an end of the target round, permission data of the target avatar associated with the avatar usage data. One or more of the modules described herein can be implemented by processing circuitry, software, or a combination thereof, for example.

In a possible implementation, the determining module 1102 is configured to obtain, from a first configuration file corresponding to the avatar usage data, at least two first avatar identifiers associated with the avatar usage data and a data identifier of sub-usage data, the sub-usage data being associated with at least two second avatar identifiers; determine, in the plurality of avatars, at least two avatars indicated by the first avatar identifiers and the second avatar identifiers as the first avatars; obtain, from the first configuration file and a second configuration file corresponding to the sub-usage data, permission data associated with the first avatar identifiers and the second avatar identifiers; and determine the permission data of the first avatars based on the permission data associated with the first avatar identifiers and the second avatar identifiers.

In a possible implementation, the determining module 1102 is configured to: traverse, based on a third avatar identifier of a third avatar in the plurality of avatars, the at least two first avatar identifiers associated with the avatar usage data; determine the third avatar as the first avatar in response to a determination that any first avatar identifier is the same as the third avatar identifier; and traverse the at least two second avatar identifiers associated with the sub-usage data in response to a determination that none of the first avatar identifiers is the same as the third avatar identifier, and determine the third avatar as the first avatar in response to a determination that any second avatar identifier is the same as the third avatar identifier.

In a possible implementation, the apparatus further includes: an avatar obtaining module, configured to obtain, from the plurality of avatars, avatars that are not bound to the user account, and perform, based on any of the avatars that are not bound, a step of traversing the at least two first avatar identifiers associated with the avatar usage data.

In a possible implementation, the display module 1103 is configured to display the plurality of avatars on a configuration interface for the avatar usage data in response to a configuration instruction for the avatar usage data.

The apparatus further includes an identifier obtaining module, configured to obtain avatar identifiers of at least two avatars that are selected.

The apparatus further includes a storage module configured to store the avatar identifiers to a first configuration file corresponding to the avatar usage data.

In a possible implementation, the apparatus further includes: an assignment module, configured to assign permission data for the at least two avatars based on a total usage count corresponding to the avatar usage data.

The storage module is configured to store an avatar identifier of each of the avatars in association with permission data to the first configuration file.

In a possible implementation, the apparatus further includes: a creation module, configured to create a target temporary file, the target temporary file being used for storing, avatar identifiers of the first avatars and the permission data of the first avatars.

The display module 1103 is configured to obtain the avatar identifiers and the permission data associated with the avatar identifiers from the target temporary file in response to displaying of the avatar selection interface; display, on the avatar selection interface in a selectable state, the avatar selection controls of the first avatars indicated by the avatar identifiers, and display the permission data in target positions of the avatar selection controls.

In a possible implementation, the avatar is used for indicating a virtual character or a skin resource of the virtual character.

In the apparatus provided in alae embodiments of this application, avatar usage data that has been bound to a user account is queried, to determine at least two first avatars associated with the avatar usage data and permission data of the first avatars. That is, the user has a piece of avatar usage data, so as to experience a plurality of avatars. If the user selects a target avatar from the plurality of avatars, the target avatar is loaded in the target round, and the permission data of the target avatar associated with the avatar usage data is updated. Through application of the foregoing apparatus, the user does not need spend a lot time in collecting different usage data when the user wants to experience different avatars, thereby reducing complexity of user operations, improving the efficiency of human-computer interaction, and improving user experience.

When the apparatus for processing avatar usage data provided in the foregoing embodiment processes avatar usage data, divisions of the foregoing functional modules are described by using an example. During actual application, the foregoing functions may be allocated to and completed by different functional modules according to requirements, that is, the internal structure of the apparatus is divided into different functional modules, to complete all or some of the foregoing described functions. In addition, the apparatus for processing, avatar usage data provided in the foregoing embodiment and the embodiments of the method for processing avatar usage data belong to the same concept. For a specific implementation process, reference may be made to the embodiments of the data processing method Details are not described herein again.

The computer device provided in the foregoing technical solutions may be implemented as a terminal or a server, for example, the computer device includes one or more processors and one or more memories, the one or more memories storing at least one piece of program code, the at least one piece of program code being loaded and executed by the one or more processors to perform the following operations; querying obtained avatar usage data in response to starting of a target round, the avatar usage data being used for indicating a use permission for at least two avatars; determining at least two first avatars associated with the avatar usage data in a plurality of avatars and permission data of the first avatars displaying avatar selection controls of the at least two first avatars in a selectable state on an avatar selection interface, one avatar selection control displaying permission data of a corresponding first avatar, loading a target avatar in the target round in response to a selection operation on a target avatar selection control on the avatar selection interface, the target avatar being a first avatar corresponding to the target avatar selection control; and updating, in response to an end of the target round, permission data of the target avatar associated with the avatar usage data.

In a possible implementation, the determining at least two first avatars associated with the avatar usage data in a plurality of avatars and permission data of the first avatars includes: obtaining, from a first configuration file corresponding to the avatar usage data, at least two first avatar identifiers associated with the avatar usage data and a data identifier of sub-usage data, the sub-usage data being associated with at least two second avatar identifiers; determining, in the plurality of avatars, at least two avatars indicated by the first avatar identifiers and the second avatar identifiers as the first avatars; obtaining, from the first configuration file and a second configuration file corresponding to the sub-usage data, permission data associated with the first avatar identifiers and the second avatar identifiers; and determining the permission data of the first avatars based on the permission data associated with the first avatar identifiers and the second avatar identifiers.

In a possible implementation, the determining, in the plurality of avatars, at least two avatars indicated by the first avatar identifiers and the second avatar identifiers as the first avatars includes: traversing, based on a third avatar identifier of any avatar in the plurality of avatars, the at least two first avatar identifiers associated with the avatar usage data, determining the any avatar as the first avatar in response to a determination that any first avatar identifier is the same as the third avatar identifier and traversing the at least two second avatar identifiers associated with the sub-usage data in response to a determination that none of the first avatar identifiers is the same as the third avatar identifier, and determining the any avatar as the first avatar in response to a determination that any second avatar identifier is the same as the third avatar identifier.

In a possible implementation, the traversing, based on a third avatar identifier of any avatar in the plurality of avatars, the at least two first avatar identifiers associated with the avatar usage data includes; obtaining, from the plurality of avatars, avatars that are not bound to a user account, and performing, based on any of the avatars that are not bound, an operation of traversing the at least two first avatar identifiers associated with the avatar usage data.

In a possible implementation, before the querying, in response to a user starting a target round, avatar usage data that has been bound to a user account of the user, the method further includes: displaying a plurality of avatars on a configuration interface for the avatar usage data in response to a configuration instruction for the avatar usage data; obtaining avatar identifiers of at least two avatars that are selected; and storing the avatar identifiers to a first configuration file corresponding to the avatar usage data.

In a possible implementation, after the obtaining avatar identifiers of at least two avatars that are selected, the method further includes: assigning permission data for the at least two avatars based on a total usage count corresponding to the avatar usage data; and storing an avatar identifier of each of the avatars in association with permission data to the first configuration file.

In a possible implementation, before the displaying avatar selection controls of the at least two first avatars in a selectable state on an avatar selection interface, the method further includes creating a target temporary file, the target temporary file being used for storing avatar identifiers of the first avatars and the permission data of the first avatars.

The displaying, avatar selection controls of the at least two first avatars in a selectable state on an avatar selection interface, one avatar selection control displaying permission data of a corresponding first avatar includes: obtaining the avatar identifiers and the permission data associated with the avatar identifiers from the target temporary file in response to displaying of the avatar selection interface, displaying, on the avatar selection interface in a selectable state, the avatar selection controls of the first avatars indicated by the avatar identifiers; and displaying, the permission data at target positions of the avatar selection controls.

In a possible implementation, the avatar is used for indicating a virtual character or a skin resource of the virtual character.

Figure 12:
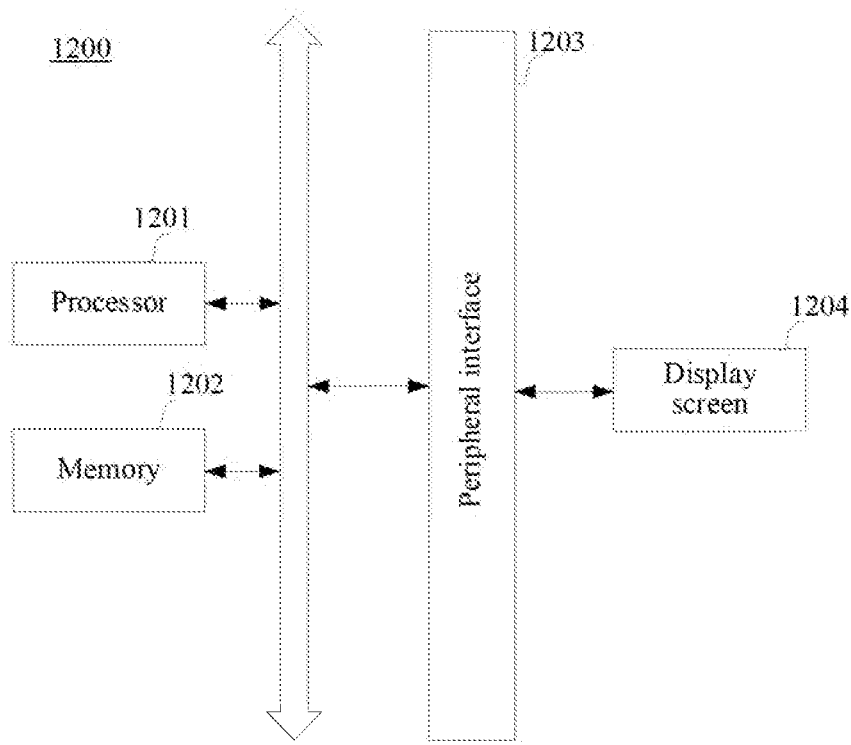
FIG. 12 is a schematic structural diagram of a terminal according to an embodiment of this application.

Descriptions are made below by using an example in which the computer device is a terminal. FIG. 12 is a schematic structural diagram of a terminal according to an embodiment of this application. The terminal 1200 may be a smartphone, a tablet computer, a Moving Picture Experts Group Audio Layer III (MP3) player, a Moving Picture Experts Group Audio Layer IV (MP4) player, a notebook computer, or a desktop computer. The terminal 1200 may also be referred to as other names such as user equipment, a portable terminal, a laptop terminal, or a desktop terminal.

Generally, the terminal 1200 includes one or more processors 1201 and one or more memories 1202.

The processor 1201 may include one or more processing cores, for example, a 4-core processor or an 8-core processor. In some embodiments, the processor 1201 may be integrated with a graphics processing unit (GPU). The GPU is configured to render and draw content that needs to be displayed on a display screen. In some embodiments, the processor 1201 may further include an AI processor. The AI processor is configured to process computing operations related to ML.

The memory 1202 may include one or more computer-readable storage media that may be non-transitory. In some embodiments, a non-transient computer-readable storage medium in the memory 1202 is configured to store at least one piece of program code, and the at least one piece of program code is configured to be executed by the processor 1201 to implement the method for processing avatar usage data provided in the method embodiments of this application.

In some embodiments, the terminal 1200 may optionally include a peripheral interface 1203 and at least one peripheral. The processor 1201, the memory 1202, and the peripheral interface 1203 may be connected by using a bus or a signal cable. Each peripheral may be connected to the peripheral interface 1203 by using a bus, a signal cable, or a circuit board. Further, the peripheral includes a display screen 1204.

The peripheral interface 1203 may be configured to connect the at least one peripheral related to input/output (ISO) to the processor 1201 and the memory 1202.

The display screen 1204 is configured to display a user interface (UI). The UI may include a graphic, a text, an icon, a video, and any combination thereof. When the display screen 1204 is a touchscreen, the display screen 1204 is further capable of acquiring a touch signal on or above a surface of the display screen 1204. The touch signal may be inputted into the processor 1201 as a control signal for processing. In this case, the display screen 1204 may be further configured to provide a virtual button and/or a virtual keyboard that are/is also referred to as a soft button and/or a soft keyboard. In some embodiments, there may be one display screen 1204 disposed on a front panel of the terminal 1200. In some other embodiments, there may be at least two display screens 1204 respectively disposed on different surfaces of the terminal 1200 or designed in a foldable shape. In still some other embodiments, the display screen 1204 may be a flexible display screen disposed on a curved surface or a folded surface of the terminal 1200. The display screen 1204 may even be further set to have a non-rectangular irregular graph, that is, a special-shaped screen. The display screen 1204 may be prepared by using materials such as a liquid crystal display (LCD), an organic fight-emitting diode (OLED), or the like.

A person skilled in the art may understand that the structure shown in FIG. 12 does not constitute a limitation to the terminal 1200, and the terminal may include more or fewer components than those shown in the figure, or some components may be combined, or a different component deployment may be used.

Figure 13:
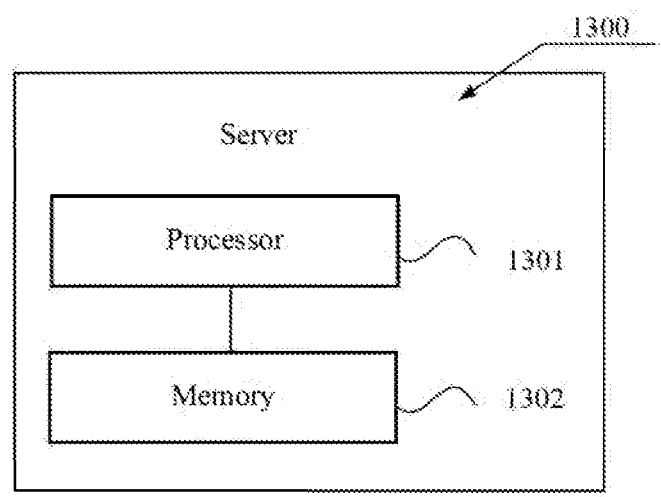
FIG. 13 is a schematic structural diagram of a server according to an embodiment of this application.

Descriptions are made below by using an example in which the computer device is a server. FIG. 13 is a schematic structural diagram of a server according to an embodiment of this application. The server 1300 may vary greatly because a configuration or performance varies, and may include one or more central processing units (CPU) 1301 (processing circuitry) and one or more memories 1302 (non-transitory computer-readable storage medium). The one or more memories 1302 store at least one piece of program code, and the at least one piece of program code is loaded and executed by the one or more processors 1301 to implement the methods provided in the foregoing various method embodiments. Certainly, the server 1300 may also have a wired or wireless network interface, a keyboard, an input/output interface and other components to facilitate input/output. The server 1300 may also include other components for implementing device functions. Details are not described herein again.

In an exemplary embodiment, a computer-readable storage medium, for example, a memory including at least one piece of program code is further provided. The at least one piece of program code may be executed by a processor to implement the method for processing avatar usage data in the foregoing embodiments. For example, the computer-readable storage medium may be a read-only memory (ROM), a RAM, a compact disc ROM (CD-ROM), a magnetic tape, a floppy disk, an optical data storage device, or the like.

In some embodiments, the at least one piece of program code is loaded and executed by the processor to implement the following operations: querying obtained avatar usage data in response to starting of a target round, the avatar usage data being used for indicating a use permission for at least two avatars; determining at least two first avatars associated with the avatar usage data in a plurality of avatars and permission data of the first avatars; displaying avatar selection controls of the at least two first avatars in a selectable state on an avatar selection interface, one avatar selection control displaying permission data of a corresponding first avatar; loading a target avatar in the target round in response to a selection operation on a target avatar selection control on the avatar selection interface, the target avatar being a first avatar corresponding to the target avatar selection control; and updating, in response to an end of the target round, permission data of the target avatar associated with the avatar usage data.

In a possible implementation, the determining at least two first avatars associated with the avatar usage data in a plurality of avatars and permission data of the first avatars includes: obtaining, from a first configuration file corresponding to the avatar usage data, at least two first avatar identifiers associated w avatar usage data and a data identifier of sub-usage data, the sub-usage data being associated with at least two second avatar identifiers; determining, in the plurality of avatars, at least two avatars indicated by the first avatar identifiers and the second avatar identifiers as the first avatars; obtaining, from the first configuration file and a second configuration file corresponding to the sub-usage data, permission data associated with the first avatar identifiers and the second avatar identifiers; and determining the permission data of the first avatars based on the permission data associated with the first avatar identifiers and the second avatar identifiers.

In a possible implementation, the determining, in the plurality of avatars, at least two avatars indicated by the first avatar identifiers and the second avatar identifiers as the first avatars includes: traversing, based on a third avatar identifier of any avatar in the plurality of avatars, the at least two first avatar identifiers associated with the avatar usage data; determining the any avatar as the first avatar in response to a determination that any first avatar identifier is the same as the third avatar identifier, and traversing the at least two second avatar identifiers associated with the sub-usage data in response to a determination that none of the first avatar identifiers is the same as the third avatar identifier, and determining the any avatar as the first avatar in response to a determination that any second avatar identifier is the same as the third avatar identifier.

In a possible implementation, the traversing, based on a third avatar identifier of any avatar in the plurality of avatars, the at least two first avatar identifiers associated with the avatar usage data includes: obtaining, from the plurality of avatars, avatars that are not bound to a user account, and performing, based on any of the avatars that are not bound, an operation of traversing the at least two first avatar identifiers associated with the avatar usage data.

In a possible implementation, before the querying, in response to a user starting a target round, avatar usage data that has been hound to a user account of the user, the method further includes: displaying a plurality of avatars on a configuration interface for the avatar usage data in response to a configuration instruction for the avatar usage data; obtaining avatar identifiers of at least two avatars that are selected; and storing the avatar identifiers to a first configuration file corresponding to the avatar usage data.

In a possible implementation, after the obtaining avatar identifiers of at least two avatars that are selected, the method further includes: assigning permission data for the at least two avatars based on a total usage count corresponding to the avatar usage data; and storing an avatar identifier of each of the avatars in association with permission data to the first configuration file.

In a possible implementation, before the displaying avatar selection controls of the at least two first avatars in a selectable state on an avatar selection interface, the method further includes creating a target temporary file, the target temporary file being used for storing avatar identifiers of the first avatars and the permission data of the first avatars.

The displaying avatar selection controls of the at least two first avatars in a selectable state on an avatar selection interface, one avatar selection control displaying permission data of a corresponding first avatar includes: obtaining the avatar identifiers and the permission data associated with the avatar identifiers from the target temporary file in response to displaying of the avatar selection interface; displaying, on the avatar selection interface in a selectable state, the avatar selection controls of the first avatars indicated by the avatar identifiers; and displaying the permission data at target positions of the avatar selection controls.

In a possible implementation, the avatar is used for indicating a virtual character or a skirt resource of the virtual character.

In some embodiments, a computer program or computer program product including at least one piece of program code is further provided, the computer program or computer program product, when run on a computer device, causing the computer device to perform the method for processing avatar usage data provided in the foregoing embodiments. Details are not described herein.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A method for processing avatar usage data, the method comprising:
    obtaining usage data of at least two first avatars and determining permission data of the first avatars, the permission data indicating a number of times each of the first avatars may be used;
    displaying, by processing circuitry of a computer device, avatar selection controls of the at least two first avatars in a selectable state on an avatar selection interface, the avatar selection controls displaying each of the first avatars together with the number of times the respective first avatar may be used;
    loading a first avatar of the at least two first avatars in response to a selection operation on a first avatar selection control of the first avatar on the avatar selection interface; and
    decreasing, in response to the loading the first avatar, the number of times the first avatar may be used.

2. The method according to claim 1, wherein the obtaining comprises:
    obtaining, from a first configuration file corresponding to the usage data, at least two first avatar identifiers associated with the usage data and a data identifier of sub-usage data, the sub-usage data being associated with at least two second avatar identifiers;
    identifying, among a plurality of avatars, at least two avatars indicated by the first avatar identifiers and the second avatar identifiers as the first avatars;
    obtaining, from the first configuration file and a second configuration file corresponding to the sub-usage data, permission data associated with the first avatar identifiers and the second avatar identifiers; and
    determining the permission data of the first avatars based on the permission data associated with the first avatar identifiers and the second avatar identifiers.

3. The method according to claim 2, wherein the identifying, among the plurality of avatars, the at least two avatars indicated by the first avatar identifiers and the second avatar identifiers as the first avatars comprises:
    traversing, based on a third avatar identifier of a third avatar of the plurality of avatars, the at least two first avatar identifiers associated with the usage data;

determining the third avatar as one of the first avatars in response to a determination that one of the first avatar identifiers is the same as the third avatar identifier; and traversing the at least two second avatar identifiers associated with the sub-usage data in response to a determination that none of the first avatar identifiers is the same as the third avatar identifier, and determining the third avatar as one of the first avatars in response to a determination that one of the second avatar identifiers is the same as the third avatar identifier.

4. The method according to claim 3, wherein before the traversing, based on the third avatar identifier of the third avatar of the plurality of avatars, the at least two first avatar identifiers associated with the avatar usage data, the method further comprises:

obtaining, from the plurality of avatars, avatars that are not bound to a user account, and performing, based on one of the avatars that are not bound, the traversing the at least two first avatar identifiers associated with the avatar usage data.

5. The method according to claim 1, wherein the method further comprises:

displaying a plurality of avatars on a configuration interface for the usage data in response to a configuration instruction for the usage data;

obtaining avatar identifiers of at least two avatars that are selected; and storing the avatar identifiers to a first configuration file corresponding to the usage data.

6. The method according to claim 5, wherein, after the obtaining the avatar identifiers of at least two avatars that are selected, the method further comprises:

assigning permission data for the at least two avatars that are selected based on a total usage count corresponding to the usage data; and storing an avatar identifier of each of the at least two avatars that are selected in association with the permission data for the at least two avatars to the first configuration file.

7. The method according to claim 1, wherein, before the displaying, the method further comprises:

creating a temporary file, the temporary file storing avatar identifiers of the first avatars and the permission data of the first avatars; and the displaying comprises:

obtaining the avatar identifiers and the permission data associated with the avatar identifiers from the temporary file in response to displaying of the avatar selection interface;

displaying, on the avatar selection interface in the selectable state, the avatar selection controls of the first avatars indicated by the avatar identifiers; and displaying the permission data on the avatar selection controls.

8. The method according to claim 1, wherein the first avatar indicates a virtual character or a skin resource of the virtual character.

9. An apparatus for processing avatar usage data, comprising: processing circuitry configured to obtain usage data of at least two first avatars and determining permission data of the first avatars, the permission data indicating a number of times each of the first avatars may be used;

display avatar selection controls of the at least two first avatars in a selectable state on an avatar selection interface, the avatar selection controls displaying each of the first avatars together with the number of times the respective first avatar may be used;

load a first avatar of the at least two first avatars in response to a selection operation on a first avatar selection control of the first avatar on the avatar selection interface; and decrease, in response to the loading the first avatar, the number of times the first avatar may be used.

10. The apparatus according to claim 9, wherein the processing circuitry is further configured to:

obtain, from a first configuration file corresponding to the usage data, at least two first avatar identifiers associated with the usage data and a data identifier of sub-usage data, the sub-usage data being associated with at least two second avatar identifiers;

identify, among a plurality of avatars, at least two avatars indicated by the first avatar identifiers and the second avatar identifiers as the first avatars;

obtain, from the first configuration file and a second configuration file corresponding to the sub-usage data, permission data associated with the first avatar identifiers and the second avatar identifiers; and determine the permission data of the first avatars based on the permission data associated with the first avatar identifiers and the second avatar identifiers.

11. The apparatus according to claim 10, wherein the processing circuitry is further configured to:

traverse, based on a third avatar identifier of a third avatar of the plurality of avatars, the at least two first avatar identifiers associated with the usage data;

determine the third avatar as one of the first avatars in response to a determination that one of the first avatar identifiers is the same as the third avatar identifier; and traverse the at least two second avatar identifiers associated with the sub-usage data in response to a determination that none of the first avatar identifiers is the same as the third avatar identifier, and determining the third avatar as one of the first avatars in response to a determination that one of the second avatar identifiers is the same as the third avatar identifier.

12. The apparatus according to claim 11, wherein the processing circuitry is further configured to:

obtain, from the plurality of avatars, avatars that are not bound to a user account, and perform, based on one of the avatars that are not bound, the traversing the at least two first avatar identifiers associated with the avatar usage data.

13. The apparatus according to claim 9, wherein the processing circuitry is further configured to:

display a plurality of avatars on a configuration interface for the usage data in response to a configuration instruction for the usage data;

obtain avatar identifiers of at least two avatars that are selected; and store the avatar identifiers to a first configuration file corresponding to the usage data.

14. The apparatus according to claim 13, wherein, after the obtaining the avatar identifiers of at least two avatars that are selected, the processing circuitry is further configured to:

assign permission data for the at least two avatars that are selected based on a total usage count corresponding to the usage data; and store an avatar identifier of each of the at least two avatars that are selected in association with the permission data for the at least two avatars to the first configuration file.

15. The apparatus according to claim 9, wherein before the displaying, the processing circuitry is further configured to create a temporary file, the temporary file storing avatar identifiers of the first avatars and the permission data of the first avatars; and the processing circuitry is configured to display the avatar selection controls by:
- obtaining the avatar identifiers and the permission data associated with the avatar identifiers from the temporary file in response to displaying of the avatar selection interface;
- displaying, on the avatar selection interface in the selectable state, the avatar selection controls of the first avatars indicated by the avatar identifiers; and
- displaying the permission data on the avatar selection controls.

16. The apparatus according to claim 9, wherein the first avatar indicates a virtual character or a skin resource of the virtual character.

17. A non-transitory computer-readable storage medium storing computer-readable instructions thereon, which, when executed by a computer device, cause the computer device to perform a method for processing avatar usage data, the method comprising:
- obtaining usage data of at least two first avatars and determining permission data of the first avatars, the permission data indicating a number of times each of the first avatars may be used;
- displaying avatar selection controls of the at least two first avatars in a selectable state on an avatar selection interface, the avatar selection controls displaying each of the first avatars together with the number of times the respective first avatar may be used;
- loading a first avatar of the at least two first avatars in response to a selection operation on a first avatar selection control of the first avatar on the avatar selection interface; and
- decreasing, in response to the loading the first avatar, the number of times the first avatar may be used.

18. The non-transitory computer-readable storage medium according to claim 17, wherein the determining comprises:
- obtaining, from a first configuration file corresponding to the usage data, at least two first avatar identifiers associated with the usage data and a data identifier of sub-usage data, the sub-usage data being associated with at least two second avatar identifiers;
- identifying, among a plurality of avatars, at least two avatars indicated by the first avatar identifiers and the second avatar identifiers as the first avatars;
- obtaining, from the first configuration file and a second configuration file corresponding to the sub-usage data, permission data associated with the first avatar identifiers and the second avatar identifiers; and
- determining the permission data of the first avatars based on the permission data associated with the first avatar identifiers and the second avatar identifiers.

19. The non-transitory computer-readable storage medium according to claim 18, wherein the identifying, among the plurality of avatars, the at least two avatars indicated by the first avatar identifiers and the second avatar identifiers as the first avatars comprises:
- traversing, based on a third avatar identifier of a third avatar of the plurality of avatars, the at least two first avatar identifiers associated with the usage data;
- determining the third avatar as one of the first avatars in response to a determination that one of the first avatar identifiers is the same as the third avatar identifier; and
- traversing the at least two second avatar identifiers associated with the sub-usage data in response to a determination that none of the first avatar identifiers is the same as the third avatar identifier, and determining the third avatar as one of the first avatars in response to a determination that one of the second avatar identifiers is the same as the third avatar identifier.

20. The non-transitory computer-readable storage medium according to claim 19, wherein before the traversing, based on the third avatar identifier of the third avatar of the plurality of avatars, the at least two first avatar identifiers associated with the avatar usage data, the method further comprises:
- obtaining, from the plurality of avatars, avatars that are not bound to a user account, and performing, based on one of the avatars that are not bound, the traversing the at least two first avatar identifiers associated with the avatar usage data.

\* \* \* \* \*